US006181239B1

(12) United States Patent
Ahmed

(10) Patent No.: US 6,181,239 B1
(45) **Date of Patent: *Jan. 30, 2001**

(54) METHOD AND APPARATUS FOR TIMING BELT DRIVE

(76) Inventor: Adel Abdel Aziz Ahmed, 160 Ridgeview Cir., Princeton, NJ (US) 08540

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/067,390

(22) Filed: Apr. 28, 1998

(51) Int. Cl.[7] ...... B60Q 1/00

(52) U.S. Cl. ...... 340/438; 340/439; 340/459

(58) Field of Search ...... 340/438, 439, 340/459, 676

(56) References Cited

U.S. PATENT DOCUMENTS

| | | | |
|---|---|---|---|
| 1,481,471 | 1/1924 | LaLonde . | |
| 2,345,415 | 3/1944 | Nagy, Jr. | 198/232 |
| 4,462,523 | 7/1984 | Kerr | 198/810 |
| 4,488,363 | 12/1984 | Jackson et al. | 34/55 |
| 4,626,230 * | 12/1986 | Yasuhara | 474/106 |
| 4,721,496 | 1/1988 | Yokoyama et al. | 474/205 |
| 4,855,709 | 8/1989 | Naderi | 340/438 |
| 4,861,403 | 8/1989 | Yoshimi et al. | 156/138 |
| 4,996,954 | 3/1991 | Seki et al. | 123/90.16 |
| 5,374,222 | 12/1994 | Hoffman et al. | 474/150 |
| 5,378,206 | 1/1995 | Mizuno et al. | 474/263 |
| 5,463,898 | 11/1995 | Blander et al. | 73/116 |
| 5,471,895 | 12/1995 | Ohmon et al. | 74/567 |
| 5,645,504 | 7/1997 | Westhoff | 474/250 |
| 5,994,712 | 11/1999 | Mack | 250/559.45 |

FOREIGN PATENT DOCUMENTS

| | | |
|---|---|---|
| 60-50232 | 3/1985 | (JP) . |
| 9-60694 | 3/1997 | (JP) . |
| 188591 | 7/1994 | (KR) . |
| 169630 | 4/1997 | (KR) . |
| 118378Y | 4/1998 | (KR) . |
| 164197 | 6/1998 | (KR) . |
| 189453 | 9/1998 | (KR) . |

OTHER PUBLICATIONS

Translation of previously cited Japan patent document No. 9–60694 of record in this application.

Translation of Abstract of previously cited Korea patent document No. KR 118378Y of record in this application.

Copy of previously cited Korea patent document No. KR 118378Y of record in this application.

1981–94 Timing Belt Replacem ent Intervals –.

Internet address: http://www.connieanddicks.com/belt.txt.

Timing Belt Information Page—Auto–Industry.com.

Internet address: http:// www.auto–industry.com/tec ch_t-belt.htm.

Timing Belt Replacement Recommendations—The Gates Rubber Com Company, 990 South Broadway, P.O. Box 5887, Denver, Colorado 8 0217 (303)744–1911 Feb. 1996.

Toyota Landcruiser Pickup—Tropical Specifications—http://www.sim.org/biz/mss/landpick.html.

Toyota Landcruiser Station Wagon Trop—http://www.toyota–gib.com/tlesww.htm.

Toyota Hilux Double Cabin Pick–up Trop—http://www.toyota–gib.com/thdcpuw.htm.

(List continued on next page.)

*Primary Examiner*—Daryl Pope

(57) ABSTRACT

A timing belt system for an engine includes a first timing belt coupling the camshaft to the crankshaft and a parallel second timing belt coupling the camshaft to the crankshaft. A belt sensor provides an alarm signal upon failure of either timing belt. While the other belt continues to function and thereby prevents damage to the engine from occurring, the alarm signal alerts the operator that a broken belt should be replaced.

35 Claims, 6 Drawing Sheets

OTHER PUBLICATIONS

Figure 1:
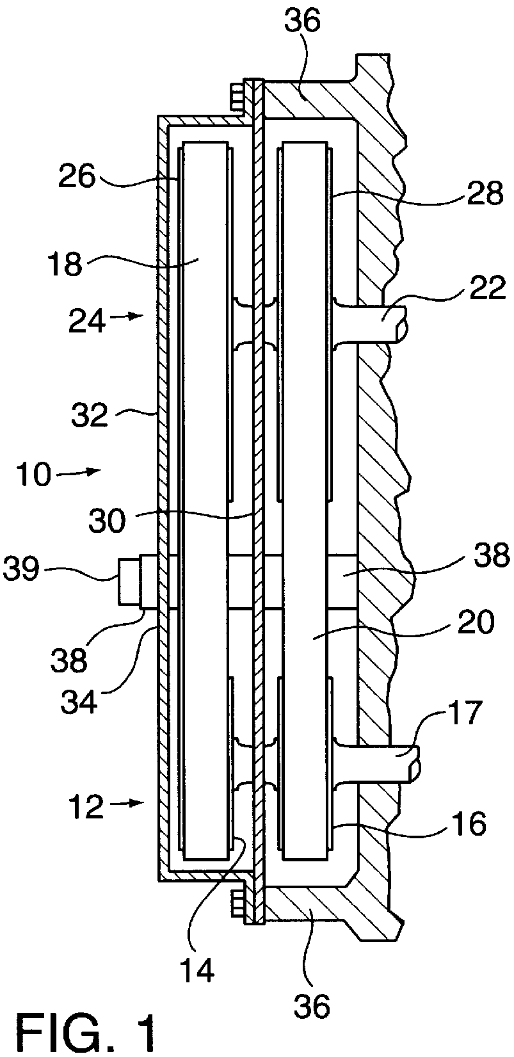

Toyota Landcruiser HZJ105 STD Station Wagon—http://www.toyota–gib.com/105%20GCMRS.htm.

Timing Belt Replacement Intervals and Interference Designation. 1970—1997 Domestic & Imported Cars http://www.connieand dicks.com/tbelt.html#VOLVO.

Steve Paul's Steve's BMW—<1>Bring mich Werkstatt—http://www.prima.ruhr.de/home/wob bb/bmw.htm.

neon enthusiasts frequently asked q questions—last changed Sep. 1, 1997 —http://www.enthusiasts.com/faq/.

A Caution from Gates Engineers . . . Sep. 3, 1997—http://www.gates.com/interfer.html.

America on the Road—Change that Timing Belt! © © 1998—Copyright 1997 LA Times Syndicate http://:www.talkcity.com/autoonramp/aotr/article10.html.

Straight Talk . . . about timing belts—http://www.aeroad.net/carfix/3page3.html.

Ignoring timing betls can be costly mistake—Wade Hoyt, Los Angeles Times Syndicate (undated) 525 Washington St., Route 20, Auburn, MA 01501—(800)755–7255.

Timing Belt Could Lead to Expensive Engine Repair—published by Gates Company, http://www.martinsburg.com/car–tune/tbneglect.htm.

Do you know if your Car's Engine has a Timing Belt? by Stan Stephenson, Auto–Talk On–Line http://www.martinsburg.com/car–tune/timebelt.htm.

The Detroit News, Stop twiddling your thumbs and replace that timing belt, Sep. 4, 1996 216 E. 45th St., New York, NY 10017; http://detnews.com/AUTOS/9609/04/tomray.htm.

Menlo Chevron—Timing Belts—1200 El Camino Real, Menlo Park, CA 94025; (650) 323–4239 http://www.menlochevron.com/belts.html.

Driving Belt by Bosch—The Bosch Group—http://babelfish.altavista.digital.com/cgi–bin/translate?–BOSCH Antriebsriemen von Bosch—Robert Bosch GmbH, KH/KBT Postfach 410960, D–76225 Karlsruhe—http://www.bosch.de/aad/produkte/antriebsriemen/index.htm#7.

Gates Power Transmission Belts—Copyright © 1998 The Gates Rubber Co., Denver, Colorado Last revised Dec. 17, 1997—http://www.gates.com/indelts.html.

Flennor Timing Belts and Pulleys, © 1997 FLENNOR Division of Norco Inc., 139 Ethan Allen Highway Ridgefield, CT 06877, (203)544–8301—http://www.flennor.com/beltsandpulleys.html#timing belt drives Miata Mailing list: Feb. 1997, Message #442—http://realbig.com/miata/97–02/442.html.

Friedrich Muller "Dynamics of toothed belt expensive impulses" mueller@itv.uni hannover.de.

* cited by examiner

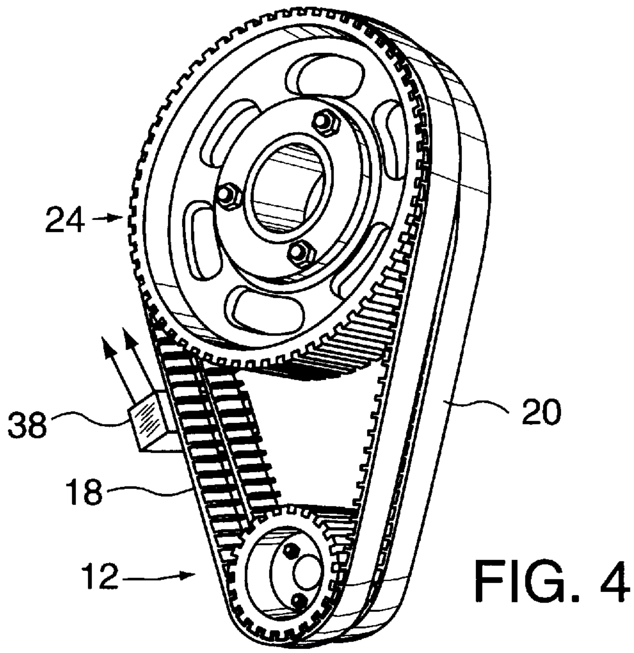
FIG. 4
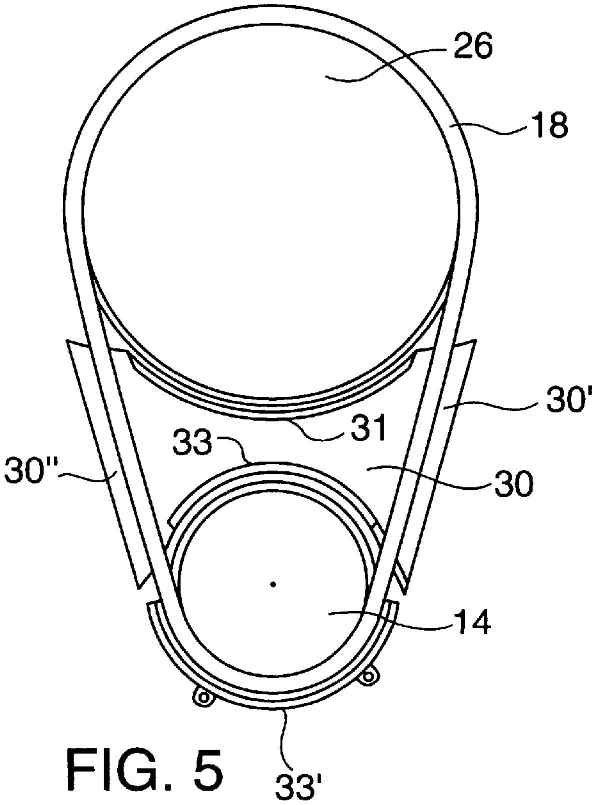
FIG. 5
FIG. 6
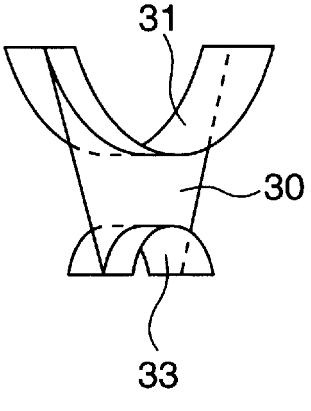

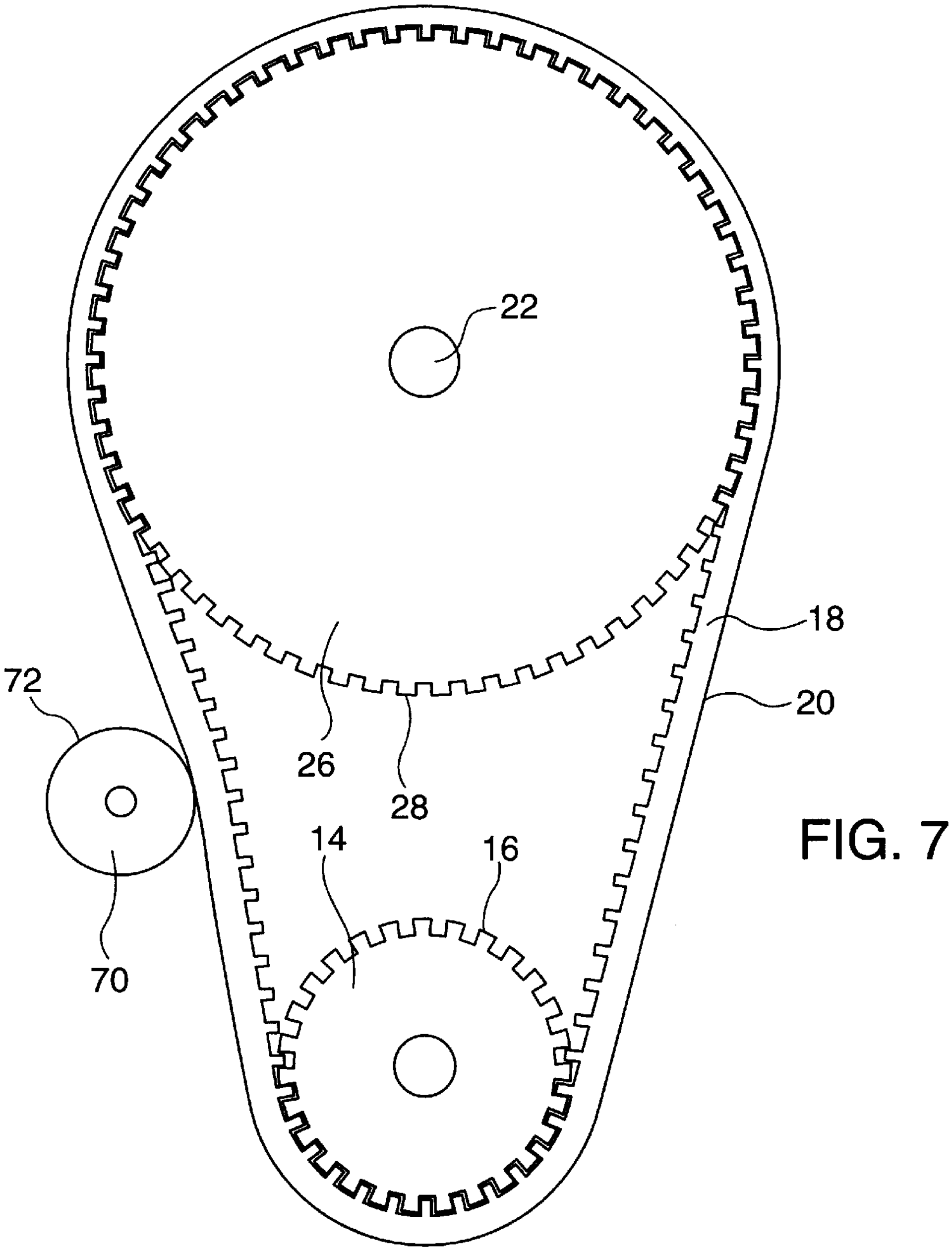
FIG. 7
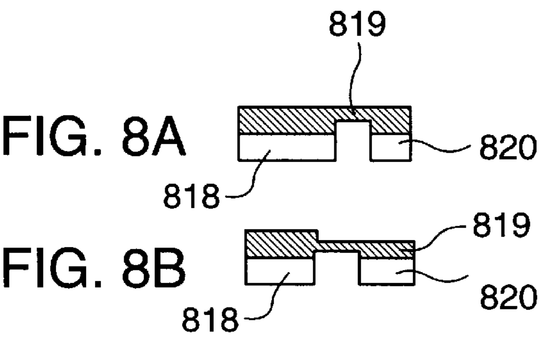
FIG. 8A
FIG. 8B

METHOD AND APPARATUS FOR TIMING BELT DRIVE

The present invention relates generally to toothed belt drives and more particularly to a method and apparatus for protection from damage following failure of a toothed belt drive as utilized for example in timing belt applications wherein belt failure may result in expensive damage or dangerous consequences.

Toothed belt drives are commonly utilized for mechanical power transmission, particularly where a correct angular relationship or “timing” between a driving shaft and a driven shaft needs to be accurately maintained.

Vehicles utilizing internal combustion engines typically have a camshaft with spaced cams mounted on the camshaft for opening and closing engine valves in accordance with the requirements of the engine operating cycle. Some engines use a single camshaft whereas others utilize a plurality of camshafts, for example, two camshafts. The camshafts are typically driven by the engine crankshaft which also transmits the engine power through the vehicle transmission to the wheels.

A typical application for a toothed belt drive is, for example, in a four-stroke cycle automotive engine wherein a camshaft used for operating valves runs at one-half the angular velocity or, otherwise expressed, at one-half the revolutions per minute (rpm) of the crankshaft that drives it by way of the toothed belt and wherein the angular position relationship or timing of the camshaft and crankshaft needs to be maintained accurately.

Traditionally in the past, “link” or bicycle chain type timing chains, sometimes utilizing double side by side chains, have been used in car engines to couple the crankshaft to the camshaft, using a driven camshaft sprocket having twice as many teeth as a driving crankshaft sprocket. In some engines, a timing gear train has been used to drive the camshaft from the crankshaft.

Chains and gears are both capable of driving a camshaft while maintaining the required timing relationship between the camshaft and the crankshaft. However, the high cost of chain and gear drives and, to some extent, their operating noise level have more recently led to the widespread use of toothed belts for coupling the crankshaft and the camshaft in automotive engines, particularly in smaller engines. A toothed belt drive is quiet and well suited to driving the camshaft while maintaining the required timing relationship to the crankshaft. The same timing belt drive may also be used to drive, for example, a fuel injection pump, an ignition distributor, or some other accessory.

Examples of toothed belt and timing chain drives may be found in, for example, U.S. Pat. No. 5,463,898 entitled METHOD OF DETECTING TIMING APPARATUS MALFUNCTION IN AN ENGINE issued Nov. 7, 1995 in the name of Blander et al.; and U.S. Pat. No. 5,689,067 entitled DIAGNOSTIC METHOD AND APPARATUS FOR MONITORING THE WEAR OF AT LEAST AN ENGINE TIMING CHAIN issued Nov. 18, 1997 in the name of Klein et al., whereof the disclosure is herein incorporated by reference to the extent it is not incompatible with the present invention.

While a toothed timing belt drive offers advantages, the likelihood of belt failure is present. If a timing belt breaks in such an engine, the camshaft will very soon stop rotating, while the crankshaft will typically continue to turn for a time, either due to its rotational momentum and/or because it is coupled to the driving wheels which continue to turn because of the vehicle’s momentum.

In some cases, repairing the engine following such a timing belt failure may merely require realigning the camshaft and the crankshaft into proper relationship and replacing the belt. Naturally, the vehicle will be inoperable until the belt is replaced, generally in a repair shop, and the operator may be stranded. Furthermore, since a broken timing belt can cause instant and total loss of power at an unexpected moment, a potentially hazardous traffic situation can result.

However, in a number of engines utilizing a high compression ratio, clearance space at the top of the cylinders may be very restricted such that the pistons can only move freely to the top of their stroke with valves in the closed position.

In such an engine, if the crankshaft is rotating and the camshaft stops so that a valve is held open by its cam, interference between a piston and a stopped valve can occur so that a piston can collide with the stopped valve. This generally leads to extensive damage, and possibly ruining the engine so that the cost of repair is no longer economically justifiable. The likelihood that the problem of valve/piston interference will occur in at least one cylinder of such an engine is generally very high upon loss of a timing belt.

When such interference occurs after timing belt breakage, damage may range from a bent valve, and/or a hole in a piston, damage to a cylinder head and/or a camshaft, a gouged cylinder head, to a completely ruined engine.

As was stated above, the problem of serious damage following timing belt failure is very likely to occur in high compression ratio engines. These include many high-performance engines and compression-ignition or “diesel” engines wherein the very high compression ratio needed for ignition generally leaves insufficient room for a piston to avoid hitting a valve held open by an inoperative camshaft. Despite the problems consequent on timing belt failure, car manufacturers continue to build such “interference engines” which exhibit the problem, apparently because a “free-running engine” with enough clearance results in lower performance. The problem represents a weak point in engine reliability and, given the usually catastrophic damage resulting from timing belt failure, is likely to result in lowering of customer confidence in the product.

The problem of serious damage caused by timing belt failure in automotive engines has been addressed to some extent by maintenance schedules for periodically replacing toothed timing belts in such engines at an interval based on the average life expectancy of such belts. For example, an extensive list of “interference engines”, that is, engines where serious damage is likely following timing belt failure, was made available by The Gates Rubber Company on the Internet at the address http://www.gates.com/interfer.html. Manufacturer’s service manuals generally suggest periodic replacement of the belt as precautionary maintenance every 60,000 to 80,000 miles of driving or so.

However, even periodic scheduled belt replacement can, at best, only reduce the average probability of belt failure: an individual belt may exhibit a shorter operating life than the average and, even with a new belt installed, initial failure remains a possibility, resulting in expensive damage to an engine. Generally, the timing belt in a typical automotive engine is not readily visible to the operator and regular inspection to ascertain the condition of a timing belt is inconvenient, even if it were a reliable way of predicting failure.

Typically, timing belt replacement as a maintenance service requires to be performed by qualified personnel in a repair shop and so is not an inexpensive job. In practice, it may not always be performed at the recommended intervals.

The problem of belt failure has been addressed in, for example, U.S. Pat. No. 4,488,363 entitled COMBINATION IDLER AND BELT FAILURE SWITCH FOR A DRYER issued Dec. 18, 1984 in the name of Jackson et al., whereof the disclosure is herein incorporated by reference to the extent it is not incompatible with the present invention. In this patent, an arrangement is disclosed for terminating the operation of a dryer upon breakage of the drive belt. It is herein recognized that such an approach will not be useful in avoiding damage due to timing belt failure in an automotive engine, since failure of the timing belt may cause damage to follow immediately upon belt failure and the engine cannot practicably be stopped before the damage has taken place.

It is herein recognized that the mere use of a warning device to indicate failure of the timing belt will be futile to prevent damage since the operator cannot stop rotation of the engine following such a warning in time to prevent damage.

It is also herein recognized that while the use of duplicate or double timing belts in itself does provide somewhat greater security than using one belt alone, it does not alone solve the problem of potential damage to the engine. With the mere use of two belts, one belt can fail unbeknownst to the operator who will generally have no knowledge that the engine is operating on one belt alone. In that situation, the engine will continue to operate in an apparently normal manner and it can therefore continue to be operated until the second belt fails. When that happens, damage to engine will occur, in the known manner hereinabove described.

In accordance with an aspect of the invention, a method for driving a camshaft from a crankshaft of an automotive engine comprises operating first and second toothed belts in parallel; detecting failure of either one of said belts; and operating an alarm when failure is detected.

In accordance with another aspect of the invention, a timing belt system for driving a camshaft from a crankshaft of an automotive engine comprises first and second toothed belts operated in parallel; a detector for detecting failure of either one of the belts; and a belt failure alarm apparatus coupled to the detector. While the other belt continues to function and thereby prevents damage to the engine, the alarm signal alerts the operator that a broken belt should be replaced.

In accordance with an aspect of the invention, a timing belt drive system for an automotive engine having a crankshaft and a camshaft, the drive system comprises a first timing belt coupling the camshaft to the crankshaft for rotation therewith at a given rotational velocity ratio; a second timing belt coupling the camshaft to the crankshaft for rotation therewith at the given rotational velocity ratio; a first sensor responsive to the first timing belt being out of its normal operating position; a second sensor responsive to the second timing belt being out of its normal operating position; and an alarm coupled to each of the first and second sensors. In accordance with another aspect of the invention, one of the sensors responds when a respective one of the first and second timing belts is broken and causes the alarm to operate.

In accordance with another aspect of the invention, the first and second timing belts are separated by a baffle plate. In accordance with another aspect of the invention, the first and second timing belts are toothed belts. Respective pulleys are mounted on the crankshaft and the camshaft for engaging the timing belts when in their respective normal operating positions.

In accordance with another aspect of the invention, a timing belt drive system includes a first timing belt coupling the camshaft to the crankshaft; a second timing belt coupling the camshaft to the crankshaft; a first sensor coupled to the first timing belt; a second sensor coupled to the second timing belt; and an alarm coupled to the first and second sensors. The alarm operates to indicate whenever at least one of the first and second belts is not present in a normal operating position.

In accordance with another aspect of the invention, a timing belt system for an engine includes a first timing belt coupling the camshaft to the crankshaft; a second timing belt coupling the camshaft to the crankshaft; a belt sensor coupled to at least one of the first and second timing belts; and an alarm coupled to the belt sensor.

In accordance with another aspect of the invention, a belt sensor is coupled to the first timing belt. In accordance with another aspect of the invention, the first and second timing belts are of different widths. In accordance with another aspect of the invention, the first and second timing belts are toothed belts of different tooth pitches.

In accordance with another aspect of the invention, a method for driving a camshaft from a crankshaft of an automotive engine comprises driving a first timing belt from the crankshaft; driving the camshaft by the first timing belt; driving a second timing belt from the crankshaft; driving the camshaft by the second timing belt; sensing when one of the first and second timing belts is not present; and thereupon operating an alarm.

Figure 2:
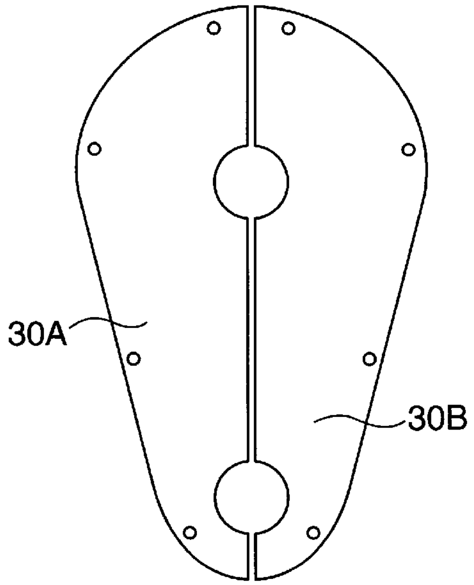

The invention will be better understood from the following detailed description of the preferred embodiments, in conjunction with the drawing, of which FIG. 1 shows a sectioned end elevation, of an embodiment in accordance with the principles of the invention;

FIG. 2 shows a baffle in accordance with the principles of the invention;

FIGS. 3, 4, 5, 6, and 7 show further details and different views of embodiments in accordance with the principles of the invention;

FIGS. 8*a* and 8*b* shows a section end view of belts in accordance with the principles of the invention; and FIGS. 9, 10, 11, 12, 13, 14 and 15 show details pertaining to sensing apparatus in accordance with the principles of the invention.

The figures are not necessarily to scale. It is also noted that pulley and belt teeth are generally detailed only over a portion of the belts and pulleys, being otherwise indicated by continuation lines which represent such teeth.

FIG. 1 shows an end elevation view of an exemplary embodiment in accordance with the invention. A toothed belt power drive, generally indicated as 10, such as may be utilized in a timing belt application in a four-stroke cycle internal combustion engine, comprises a pulley assembly 12 having first and second toothed pulley portions 14 and 16. Pulley assembly 12 is mounted to a crankshaft 17 of an internal combustion engine for locked rotation therewith for driving respective endless toothed belts 18 and 20.

A cam shaft 22 for operating valve cams (not shown) carries a pulley assembly 24 for locked rotation therewith and having toothed pulley portions 26 and 28. Pulley portions 26 and 28 are shown in effect as separate pulleys, though they may be integral. Belts 18 and 20 run over pulley portions 26 and 28, respectively. It is noted that the width of pulley portions 14, 16, 26, and 28 is shown in the drawing as being slightly wider than belts 18 and 20. This is done principally for clarity so that the pulley portions are visible in the drawing and, in practice, belts 18 and 20 can be as wide as their respective pulleys or pulley portions. Pulley portions 26 and 28 each have twice as many teeth as each of pulley portions 14 and 16, respectively. Belts 18 and 20 may also be arranged to drive auxiliaries such as a fuel pump or other unit without this being material to the nature of the present invention.

A belt presence sensing unit 38 is attached to baffle plate assembly 30 and/or to housing portion or cover 34, depending on the prevailing layout situation. Sensing unit 38 may be any of a number of suitable kinds of sensors. For example, a photo-electric sensor operating in conjunction with a light source by light transmission or reflection may be used, or a mechanical sensor with a contacting finger, or a capacitive change sensor, or any equivalent sensor may be used. Sensing unit 38 may include an alarm unit 39, or the alarm unit may be remotely mounted such as on an automobile dashboard and coupled to sensing unit 38.

As shown in FIG. 1, a protective baffle plate assembly 30 is mounted in a plane between the two belts and conveniently affixed to an engine part 36. FIG. 2 shows baffle plate assembly 30 as comprising two halves, 30A and 30B so as to facilitate assembly. Baffle plate assembly 30 helps prevent pieces of a broken timing belt from interfering with the remaining good belt.

Figure 3:
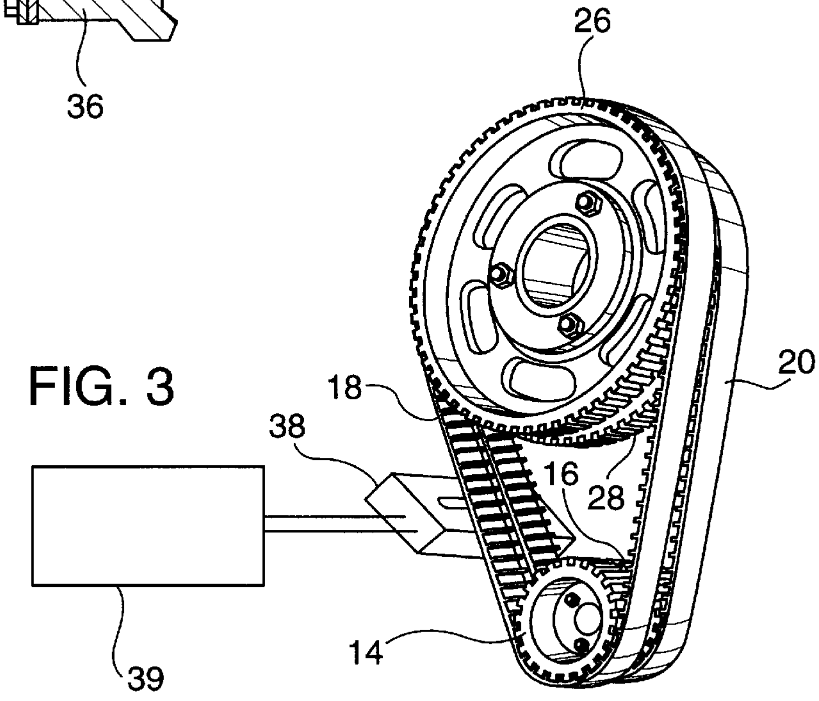

FIG. 3 shows a perspective view of the arrangement of pulley portions 26 and 28, pulley portions 14 and 16, toothed belts 18 and 20, sensing unit 38, and alarm unit 39. The baffle plate assembly is left out of the view for clarity. It is noted that belt presence sensing unit 38 is arranged to detect or sense the absence of either belt 18 or belt 20.

FIG. 4 shows a pulley assembly 24 which is, in effect, a single wide pulley having integral pulley portions dedicated to engagement with respective ones of belts 18 and 20. The belts also engaged respective pulley portions which are formed integrally on a pulley assembly 12 which is, in effect, a single wide pulley. FIG. 5 shows an alternative form of baffle plate 30, more particularly suitable for use with a single wide pulley and having optional guards 31 and 33 over the exposed parts of the pulleys. Extension portions 30' and 30" allow for mounting to the engine frame 36. FIG. 6 shows baffle plate 30 in a perspective/isometric view.

It is not necessary to the present invention that pulley portions 14 and 16 have identical numbers of teeth; it is permissible to use different sizes and/or different numbers of teeth for the pulley portions; it is only necessary that pulley portion 26 have twice as many teeth as pulley portion 14 and that pulley portion 28 have twice as many teeth as pulley portion 16. It is herein recognized that in certain situations, such as to help prevent cogging, meaning non-uniform angular velocity in the camshaft, or tooth slipping, there may be an advantage to using different pitches, different sizes, and/or different numbers of teeth on the pulley portions. When pulley portions 14 and 16 have the same number of teeth and the same pitch, then the same type and size of belt can be used in both positions. The exemplary embodiments described are shown with equal pulley portions 26 and 28, though as was explained, they can be different.

It is also common to employ one or more idler pulleys, spring-loaded or fixed, for tensioning the timing belt, usually on the slack side, as shown in FIG. 7, where idler pulley 70 runs with its surface engaging the back or untoothed side of belt 18. Idler pulley 72, aligned behind pulley 70 engages belt 20, which is aligned behind belt 18. Pulleys 16 and 28 and belt 20 coincide in the drawing with pulleys 14 and 26 and belt 18, respectively.

It is also herein recognized that the belts can be made of different widths or strengths so that the weaker belt will always tend to break earlier, thereby reducing even further the already remote chance of simultaneous failure of both belts.

While the described preferred embodiment has the advantage of using regular toothed belts and not requiring any special type of belt, it is also possible to utilize a special unitary belt which in effect uses two or more side by side belt portions 818 and 820 joined by a web 819, as shown in end view cross-section in FIG. 8. The belt portions may be of different widths as shown in FIG 8A and/or different strengths as shown in FIG. 8B. The web is of sufficient strength so as to retain fragments of a broken belt portion while continuing to run on the remaining belt portion so that a baffle is not required. Furthermore, when the belts are made of quite different widths or different strengths or both so that one is clearly likely to fail first, then it is sufficient in accordance with the invention to detect only failure of the weaker belt. However, the cost of monitoring both belts is relatively little more than monitoring both belts so that it is preferred to monitor both.

In accordance with the principles of the present invention, the engine has two modes of operation: a first mode of operation, running with two timing belts and a second mode of operation, running on one timing belt alone. In both modes, operation of the engine is normal except that, in the second mode, there is a high risk of catastrophic damage following failure of the single timing belt. In accordance with the principles of the present invention, a sensing device warns the operator when the engine is operating in the second mode, that is, on one timing belt alone. The operator is thereby warned that belt replacement is necessary during this critical second mode of operation, thereby providing an opportunity to do this before damage to the engine has occurred.

In operation, belts 18 and 20 operate in parallel to convey rotation of crankshaft 17 to camshaft 22 which runs at half the rpm or angular velocity of crankshaft 17. Belts 18 and 20, being toothed belts running over toothed pulleys serve also to maintain an exact angular relationship between crankshaft 17 and camshaft 22 so that the engine cams operate the engine valves, such as inlet and exhaust valves, in proper sequence and relationship to piston strokes. The velocity ratio between the crankshaft and the camshaft has to be the same for both belt drives.

As has been explained, in an interference type of engine, the valves are arranged to be substantially in closed position when the respective piston is at the top of its stroke. This avoids the possibility of collision or interference between piston and valves while the engine is running normally.

Belt presence sensing unit 38 senses the presence of both belts 18 and 20 during normal operation, when the belts are in their respective normal operating positions, and is arranged to cause alarm unit 39 to signal that the engine is operating in its first operating mode: the normal, safe operating condition. However, should either of belts 18 and 20 break, belt presence sensing unit is arranged to cause alarm unit 39 to indicate that the engine is operating in its second operating mode, indicating that belt servicing is required as soon as practicable.

The broken pieces of whichever of the two belts 18 and 20 has broken are prevented by baffle plate assembly 30 from interfering with the remaining good belt, which continues in operation and allows the engine to continue operating normally without damage. The vehicle may continue to be operated normally, though now at risk of damage should the remaining timing belt break. Service should therefore be performed as soon as practicable to replace the broken belt so as to keep this period of risk as short as possible. As a preventative maintenance measure, the remaining operating belt can also be economically replaced with a new belt while the belt area is accessible during the repair procedure.

Theoretically, both belts could break simultaneously; however such an occurrence is highly unlikely, as compared with the chance of one belt alone breaking at any given moment. Following breakage of one belt, it will generally be reasonably safe to drive the vehicle for an additional reasonable length of time until an opportunity is available to replace the damaged belt. Since the operator has then been alerted in accordance with the invention that the engine is operating in the second mode, the less safe mode of the two modes possible in accordance with the invention, the repair can be made at an early opportunity so as to operate the engine in its second mode as little as reasonably possible.

Figure 9:
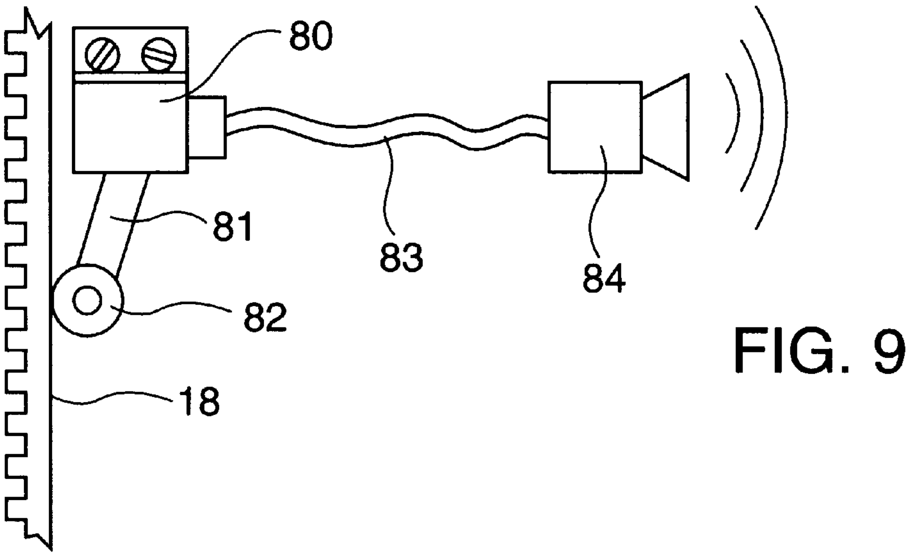
Figure 10:
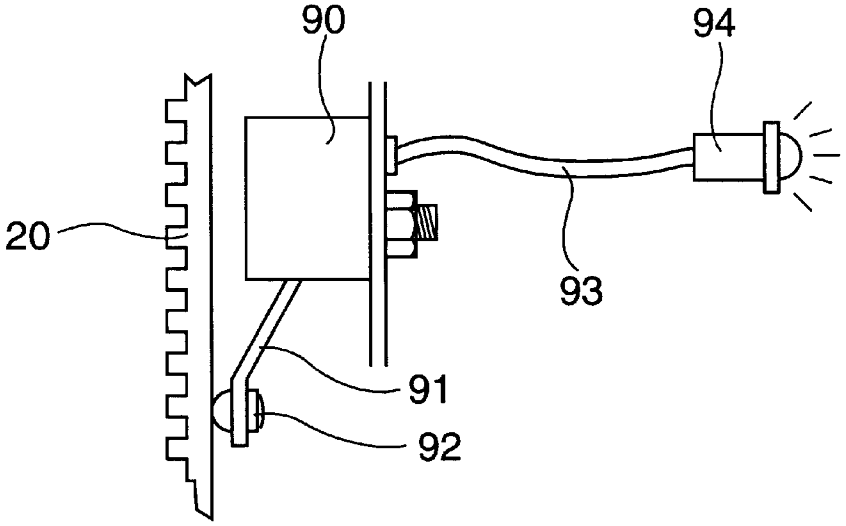

FIG. 9 shows an embodiment of a sensor for a broken or missing timing belt in accordance with the present invention. A switch 80 includes a spring loaded arm 81 carrying a follower 82 and urging it to press lightly against the back or untoothed surface of belt 18. Follower 82 can be a roller, as shown. In an alternative embodiment shown in FIG. 10, a switch 90 includes a spring loaded arm 91 carrying a follower 92 and urging it to press lightly against the back surface of belt 20. Follower 92 can be a low friction gliding head, for example made of Teflon™ or other durable low-friction material. In the case of the embodiments of FIGS. 9 and 10, the presence of the belt under the follower maintains switches 80 or 90 in the OFF position. In the event the belt is absent, spring loaded arm 81 or 91 moves as urged by its spring loading and the switch moves to the ON position, thereby electrically actuating an alarm light or a sound alarm, alerting an operator that the engine is operating in its second, or less safe mode, of the two modes possible in accordance with the invention.

Figure 11:
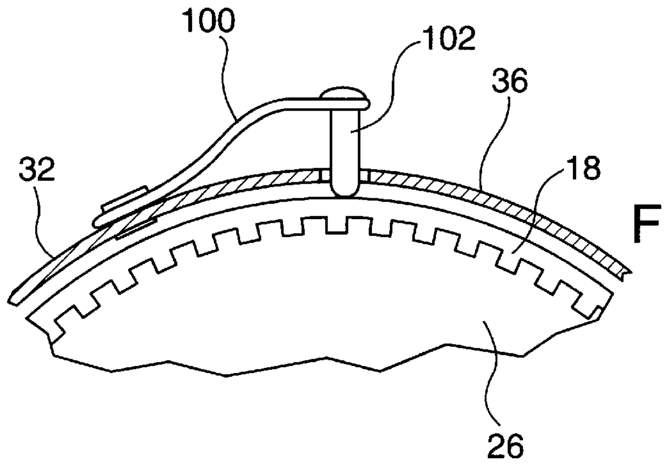

FIG. 11 shows an alternative embodiment for a missing belt alarm in accordance with the present invention. A spring arm 100 is affixed to cover portion 32 enclosing the timing belts in accordance with the invention. A follower 102, made of a durable low friction material such as Teflon™ is attached to spring arm 100 and passes through a hole in cover portion 32. Spring arm 100 urges follower 102 to press against the back or smooth side of toothed belt 18. So long as belt 18 is present, follower 102 glides over the smooth side. In the event belt 18 is missing, follower 18 is urged by spring arm 100 against the teeth on pulley 26. Rotation of pulley 26 causes follower 102 and spring arm 100 to vibrate strongly as the teeth pass the follower. The vibration is commumicated to cover portion 32 which is arranged to be of sheet metal and to vibrate in sympathy in a drum type of response which couples the vibration as sound to the air and serves as an alarm for the operator that the engine is now operating in its second and less safe mode of the two modes possible in accordance with the invention.

Figure 12:
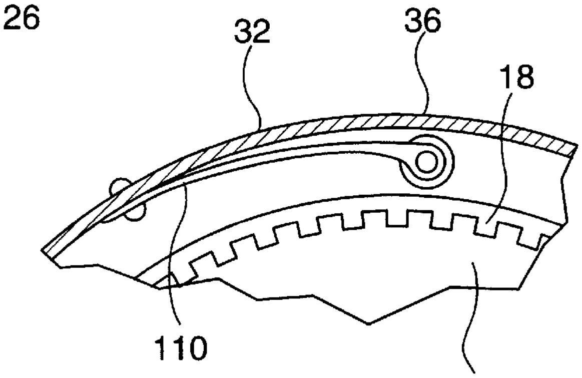

FIG. 12 shows another embodiment for a missing belt alarm in accordance with the present invention. A spring arm 110 is mounted internally within cover 32 and carries a roller 112 which it urges against the back of belt 18. In the event the belt is missing, vibrations are set up as in the case of the embodiment of FIG. 11.

Figure 13:
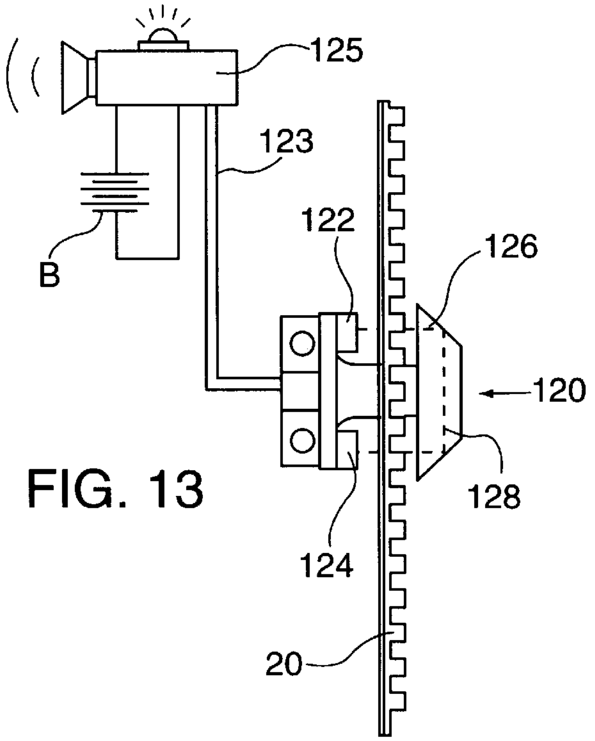

FIG. 13 shows another embodiment for a missing belt alarm in accordance with the present invention. This uses a photo-electric detector or sensor. A sensing head 120, mounted on suitable portion of engine 36 or cover portion 32, includes a light emitting diode (LED) 122 for directing light through the position occupied by belt 20 to a retroreflector 126 which returns the light, as indicated by dashed line 128, by way of a prism or mirrors to a photo-dectector 124 which is coupled for operating an alarm 125. Power from a battery B is coupled to alarm 125 and to sensing head 120 by way of a cable 123. When belt 20 is in place, no LED light is transmitted to photo-detector 124. When belt 20 is removed, as by a failure of the belt, light is received by the photo-detector and alarm 125 is activated. Sensing head 120 is readily arranged to monitor both belts and operate the alarm if either belt is missing from its normal operating position.

Figure 14:
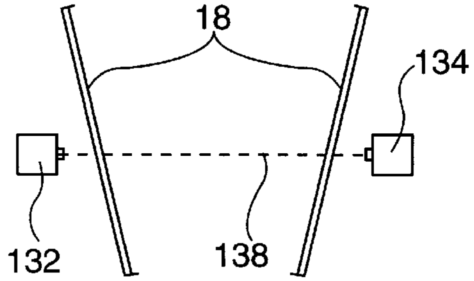

An LED light source 132 and a photo-detector 134 may also be mounted separately on opposite sides of the belts being monitored by a light beam 138, as indicated in FIG. 14.

Figure 15:
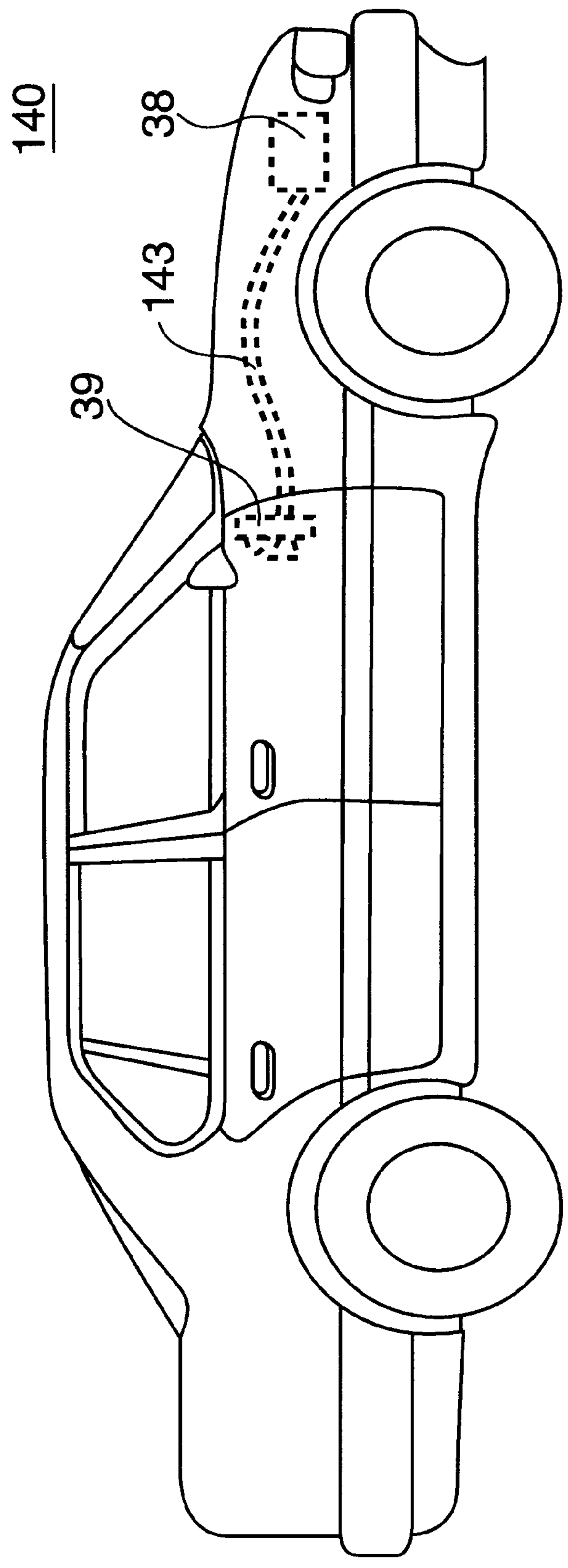

In FIG. 15, belt presence sensing unit 38 is shown mounted for operation as hereinabove explained and alarm unit 39, coupled unit 38 by way of a cable 143, is mounted in the interior, or passenger compartment of an automotive vehicle such as a car, such as on the dashboard, where it will readily alert the operator that the engine is operating in its second, less safe mode so that a repair should be undertaken soon to replace a broken timing belt.

While the invention has been described by way of illustrative embodiments, it will be apparent to one of skill in the art that various changes and modifications may be made within the spirit of the invention. Thus, the invention has been illustrated by examples from the automotive engine field; the invention is also applicable to other drive systems where drive failure may have serious consequences. While 4-stroke cycle operation has been generally described in connection with the exemplary embodiments, it will be understood that the invention is applicable to engines having a different operating cycle, such as a 2-stroke cycle. In such cases the angular velocity relationship between a crankshaft and a camshaft may be different, such as a one-to-one ratio. It is further noted that whereas a two belt system is described, the invention can encompass any other plurality of drives. Three or more belts may be used if desired. Moreover, where for example, an optical or light signal is described as in the embodiment of FIG. 7, clearly an acoustic signal may be used or an interlock for disabling the engine after a predetermined period of time, if such is deemed desirable. Furthermore, the use of any of a number of known suitable systems for indication belt failure is contemplated for the invention. While toothed timing belts have been used in the exemplary embodiments described, it is of course possible to use equivalents such as perforated belts where the pulleys have pins or stubs to engage the perforations in the belts; however, such drives are less common. These and similar modifications are intended to be within the scope of the invention which is defined by the claims following.

What is claimed is:

1. A timing belt drive system for an automotive engine having a crankshaft and a camshaft, said drive system comprising:

a first timing belt coupling said camshaft to said crankshaft for rotation therewith at a given rotational velocity ratio;

a second timing belt coupling said camshaft to said crankshaft for rotation therewith at said given rotational velocity ratio;

a first sensor responsive to said first timing belt being out of its normal operating position;

a second sensor responsive to said second timing belt being out of its normal operating position;

said engine exhibiting a first mode of operation wherein both said first and second timing belts are in normal operating position, and a second mode of operation wherein one of said first and second timing belts is out of its normal operating position and only one of said first and second belts is in its normal operating position; and an alarm coupled to each of said first and second sensors for indicating when engine operation changes from said first mode of operation to said second mode of operation.

2. A timing belt drive system in accordance with claim 1, wherein one of said sensors responds when a respective one of said first and second timing belts is broken and causes said alarm to operate.

3. A timing belt drive system in accordance with claim 1, wherein said first and second timing belts are separated by a baffle plate.

4. A timing belt drive system in accordance with claim 3, wherein said first and second timing belts are toothed belts.

5. A timing belt drive system in accordance with claim 2, wherein respective pulleys are mounted on said crankshaft and on said camshaft for engaging said timing belts when in their respective normal operating positions.

6. A timing belt drive system in accordance with claim 1, wherein first and second driving pulleys are mounted on said crankshaft and first and second driven pulley are mounted on said camshaft and wherein said first timing belt in its normal operating position engages said first driving and first driven pulleys and wherein said second timing belt in its normal operating position engages said second driving and said second driven pulleys.

7. A timing belt drive system in accordance with claim 6, wherein said baffle plate separates said first driving and driven pulleys from said second driving and second driven pulleys.

8. In an automotive engine having a crankshaft and a camshaft, a timing belt drive system including:

a first timing belt coupling said camshaft to said crankshaft;

a second timing belt coupling said camshaft to said crankshaft;

a first sensor coupled to said first timing belt for responding to said first timing belt being broken;

a second sensor coupled to said second timing belt for responding to said second timing belt being broken;

said engine exhibiting a first mode of operation wherein both said first and second timing belts are operating, and a second mode of operation wherein one of said first and second timing belts is broken and the other of said first and second belts is operating; and an alarm coupled to said first and second sensors for indicating when engine operation changes from said first mode of operation to said second mode of operation.

9. A timing belt drive system in accordance with claim 8, wherein said alarm operates to indicate whenever at least one of said first and second belts is not present in a normal operating position.

10. A timing belt system in accordance with claim 8, wherein said first and second timing belts are toothed belts.

11. A timing belt system in accordance with claim 8, wherein said first sensor comprises a switch actuated by a follower contacting said first timing belt.

12. A timing belt system, in accordance with claim 8 wherein said first sensor comprises a photo-electric detector.

13. A timing belt system in accordance with claim 8, wherein said first sensor comprises a follower contacting said first timing belt; and spring means urging said follower into contact with said toothed pulley in the absence of said toothed belt.

14. A timing belt system in accordance with claim 13, wherein said follower includes a sounding for producing a vibration sound when in contact with said toothed pulley at a time said pulley is rotating.

15. A timing belt system for coupling a camshaft of an automotive engine with a crankshaft of said engine, including;

first timing belt means for coupling said camshaft to said crankshaft;

second timing belt means for coupling said camshaft to said crankshaft;

sensing means coupled for sensing when at least one of said first and second timing belt means is broken;

said engine exhibiting a first mode of operation wherein both said first and second timing belts are in operation, and a second mode of operation wherein one of said first and second timing belts is broken and only one of said first and second belts is in operation; and alarm means coupled to said sensing means for indicating when engine operation changes from said first mode, of operation to said second mode of operation.

16. A timing belt system as recited in claim 15, wherein said first and second timing belt means have respective normal operating positions and said sensing means senses when one of said first and second belts is not in its said respective normal running position.

17. A timing belt system as recited in claim 16, wherein said alarm means comprises an optical alarm.

18. A timing belt system as recited in claim 16, wherein said alarm means comprises an acoustic alarm.

19. A timing belt system as recited in claim 16, wherein said alarm is mounted inside the passenger compartment of said automotive vehicle.

20. In an automotive vehicle having an engine including a crankshaft and a camshaft, a timing belt system for said engine, including:

a first timing belt coupling said camshaft to said crankshaft;

a second timing belt coupling said camshaft to said crankshaft;

a belt sensor coupled to said first and second timing belts for responding to at least one of said first and second timing belts being broken;

said engine exhibiting a first mode of operation wherein both said first and second timing belts are operating, and a second mode of operation wherein one of aid first and second timing belts is broken and only one of said first and second belts is operating; and an alarm coupled to said belt sensor for indicating when engine operation changes from said first mode of operation to said second mode of operation.

21. A timing belt system for an automotive engine having a crankshaft and a camshaft, including:

a first timing belt coupling said camshaft to said crankshaft;

a second timing belt coupling said camshaft to said crankshaft;

a belt breakage sensor apparatus coupled to each of said first and second timing belts;

said engine exhibiting a first mode of operation wherein both said first and second timing belts are in operation, and a second mode of operation wherein one of said first and second timing belts is broken and only one of said first and second belts is in operation; and an alarm coupled to said belt breakage sensor apparatus for indicating when engine operation changes from said first mode of operation to said second mode of operation.

22. A timing belt system as recited in claim 21, wherein said first and second timing belts are of different widths.

23. A timing belt system as recited in claim 21, wherein said first and second timing belts are of different strengths.

24. A timing belt system as recited in claim 21, wherein said first and second timing belts are toothed belts of different tooth pitches.

25. A method for driving a camshaft from a crankshaft of an automotive engine comprising:

driving a first timing belt from said crankshaft;

driving said camshaft by said first timing belt;

driving a second timing belt from said crankshaft;

driving said camshaft by said second timing belt so that said engine exhibits a first mode of operation wherein both said first and second timing belts are in respective operating positions, and a second mode of operation wherein one of said first and second timing belts is missing from its normal operating position;

sensing when engine operation changes from said first mode of operation to said second mode of operation; and thereupon operating an alarm.

26. A method for driving a camshaft in accordance with claim 25, wherein said steps of driving said timing belts from said crankshaft comprise a step of driving said timing belts by way of respective pulleys and said steps of driving said camshaft by said timing belts comprise a step of driving said camshaft by way of respective pulleys.

27. A method for driving a camshaft in accordance with claim 25, wherein said step sensing when one of said first and second timing belts is not present comprises the step of determining whether said first timing belt is not present; and the step of determining whether said second timing belt is not present.

28. A method for driving a camshaft from a crankshaft of an automotive engine comprising:

operating first and second toothed belts in parallel so that said engine exhibits a first mode of operation wherein both said first and send timing belts are operating, and a second mode of operation wherein one of said first and second timing belts is broken and only one of said first and second belts is operating;

detecting when engine operation changes from said first mode of operation to said second mode of operation; and thereupon operating an alarm.

29. A timing belt system for driving a camshaft from a crankshaft of an automotive engine comprising:

first and second toothed belts operated in parallel for operating said camshaft from said crankshaft;

said engine exhibiting a first mode of operation wherein both said first and second timing belts are in operation, and a second mode of operation wherein only one of said first and second belts is in operation;

a detector for detecting when engine operation changes from said first mode of operation to said second mode of operation; and a belt failure alarm apparatus coupled to said detector for indicating when engine operation changes from said first mode of operation to said second mode of operation.

30. A timing belt system for driving a camshaft from a crankshaft of an internal combustion engine comprising:

a plurality of toothed belts operated in parallel;

said engine exhibiting a first mode of operation wherein said plurality of said toothed belts are in operation, and a second mode of operation wherein at least one of said plurality of toothed belts is broken and fewer than all of said plurality of toothed belts are in operation;

a detector for detecting when engine operation changes from said first mode, of operation to said second mode of operation; and a belt alarm apparatus coupled to said detector for indicating when engine operation changes from said first mode of operation to said second mode of operation.

31. A timing belt drive system for an internal combustion engine having a crankshaft and a camshaft, said drive system comprising:

a multiple timing belt coupling said camshaft to said crankshaft for rotation, wherein said multiple belt comprises a first timing belt portion coupling said camshaft to said crankshaft for rotation therewith and a second timing belt portion coupling said camshaft to said crankshaft for rotation therewith, said first and second timing belt portions being joined, at least in part, by a web portion;

said engine exhibiting a first mode of operation wherein both said first and second timing belt portions are operating in parallel, and a second mode of operation wherein one of said first and second timing belt portions is broken and the other of said first and second timing belt portions is operating;

sensor apparatus responsive to timing belt portion breakage for sensing when operation of said engine changes from said first mode to said second mode of operation; and an alarm coupled to said sensor apparatus for indicating when engine operation changes from said first mode of operation to said second mode of operation.

32. A timing belt drive system as recited in claim 31, wherein said first and second timing belt portions are of different widths.

33. A timing belt drive system as recited in claim 31, wherein said first and second timing belt portions are of different thicknesses.

34. A timing belt drive system as recited in claim 31, wherein said first and second timing belt portions are of different strengths.

35. A timing belt drive system as recited in claim 31, wherein said web portion is of sufficient strength to retain fragments resulting from breakage of one of said timing belt portions.

* * * * *